June 4, 1968     H. E. ROHRBACHER     3,386,329
POWDER MEASURE FOR LOADING CARTRIDGES
Filed Sept. 29, 1966     2 Sheets-Sheet 1
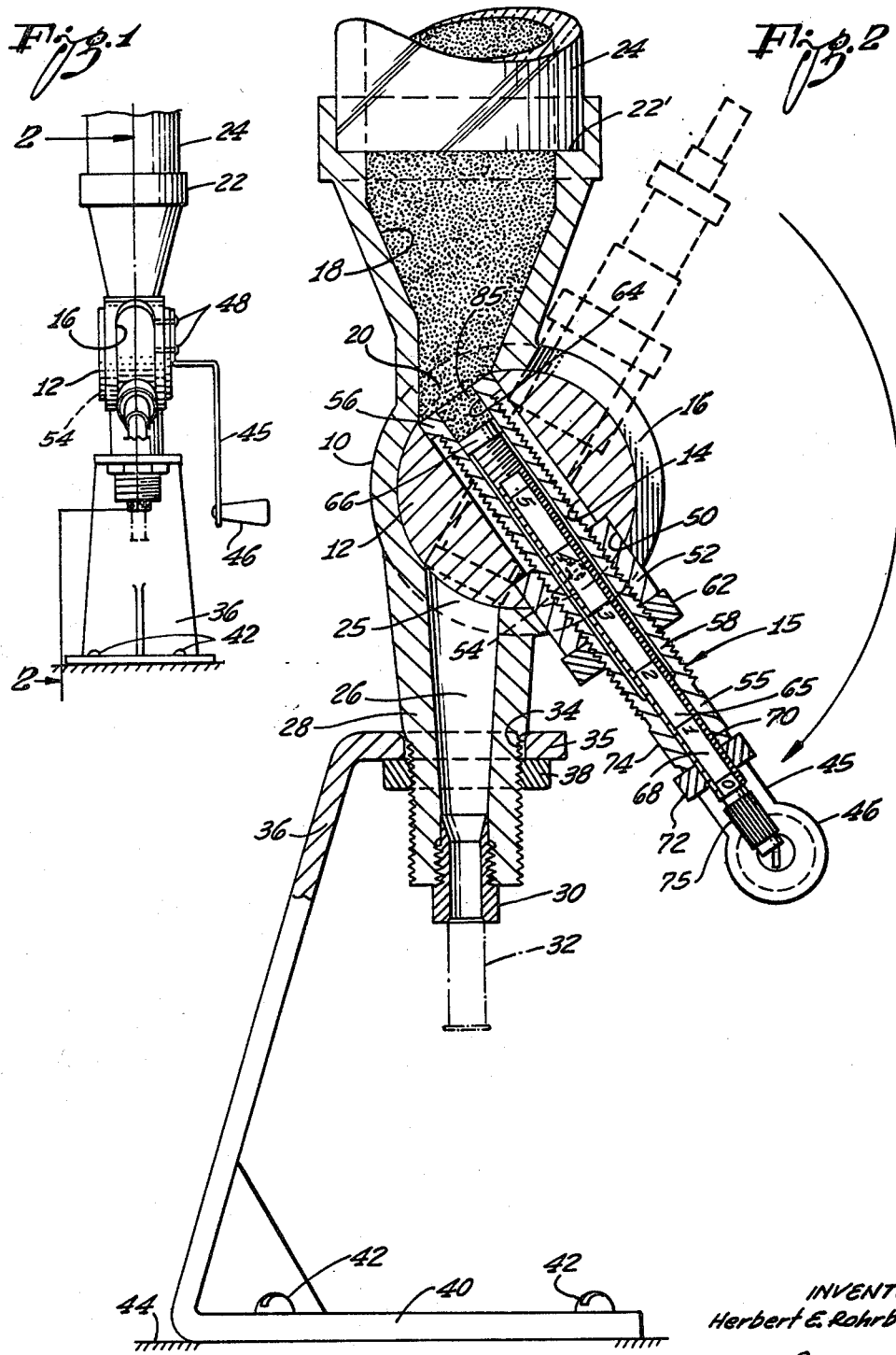
INVENTOR:
Herbert E. Rohrbacher
ATTORNEYS June 4, 1968  H. E. ROHRBACHER  3,386,329
POWDER MEASURE FOR LOADING CARTRIDGES
Filed Sept. 29, 1966  2 Sheets-Sheet 2
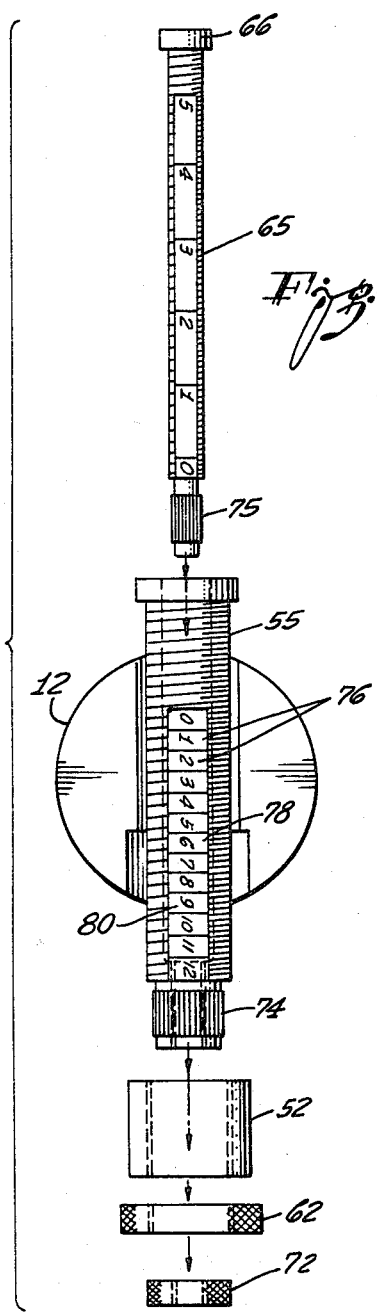
INVENTOR:
Herbert E. Rohrbacher
ATTORNEYS United States Patent Office 3,386,329
Patented June 4, 1968

3,386,329
POWDER MEASURE FOR LOADING CARTRIDGES
Herbert E. Rohrbacher, Whittier, Calif., assignor to Bergandi Manufacturing Company, Inc., El Monte, Calif., a corporation of California
Filed Sept. 29, 1966, Ser. No. 582,850
4 Claims. (Cl. 86—31)

ABSTRACT OF THE DISCLOSURE

This invention relates to apparatus for controlling the amount of gunpowder inserted into cartridges so that a first amount of gunpowder can be inserted into cartridges for pistols and a second amount of gunpowder can be inserted into cartridges for rifles. The invention includes a fixed housing and a member pivotable between first and second positions in the housing. In the first position, the member is constructed and disposed to receive a controlled amount of gunpowder from the housing, and, in the second position, the member is constructed and disposed to dispense the gunpowder into the cartridge.

The member is provided with a hollow configuration, and a first plunger is disposed in the hollow member and is adjustable in position relative to the hollow member to provide a coarse control of the volume available for the insertion of gunpowder. First means such as a first lockwasher are disposed on the hollow member for locking the first plunger in the adjusted position. The first plunger is also hollow, and a second plunger is disposed in the first plunger and is adjustable in position relative to the hollow member to provide a fine control of the volume available for the insertion of gunpowder. Second means such as a second lockwasher are disposed on the first plunger for locking the second plunger in the adjusted position. The first and second plungers are disposed on a sleeve which is releasably inserted into the hollow member to provide for a removal of the first and second plungers when it is desired to clean the plungers and the hollow member.

---

This invention relates to a device for dispensing accurate quantities of finely divided solid material and, more particularly, relates to what is termed a powder measure for loading cartridges for firearms. Such a device conventionally comprises an upright hopper to contain a supply of powder and a crank-operated measuring member rotatable between a first position to receive a measured quantity of powder from the hopper and a second position to dispense the measured quantity. To form a measuring pocket to receive and dispense an increment of powder for loading a cartridge, the rotatable measuring member is formed with a diametrical passage therethrough and a plunger is screw-threadedly mounted in the passage, the plunger being variably retracted in the passage to form the pocket. Such an arrangement permits the size of the pocket to be adjusted by rotating the screw threaded plunger.

The invention meets a number of needs for improvement of a powder measure of the character described. These needs will now be discussed.

One need is for a simpler and more convenient procedure for a change-over from measuring relatively large increments of powder for rifle cartridges to measuring smaller increments of powder for pistol cartridges. A change-over is required because the pitch of the screw thread of a plunger that is employed for loading rifle cartridges is too coarse for accurate control of the smaller volumes required for loading pistol cartridges. One prior art procedure for this purpose involves substitution of one plunger means for another, one plunger being of relatively large diameter with relative coarse threads for measuring increments for loading rifle cartridges, the other plunger means being of smaller diameter with a finer screw thread for measuring the smaller increments required for smaller pistol cartridges.

A second need is for finer adjustment of the increments of powder that are measured out for rifle cartridges. A high degree of accuracy is sought and one turn of a conventional measuring plunger results in too great a change for highly accurate measurement.

A third need for improvement is a convenient and expeditious procedure for completely emptying the hopper when it is desired to change over from one grade of powder to another grade. It is highly important that no residue be carried over in changing from one grade of powder to another.

A fourth need which is similar to the third need is to make it possible to quickly and easily dismantle the device to make all of the parts completely accessible for cleaning, and especially the working parts of the device.

With reference to the first and second needs, the invention is characterized by the concept of providing a longitudinal passage in the plunger that is employed to measure increments of powder for loading rifle cartridges and of providing a second smaller plunger axially adjustable in this second passage. The larger plunger is used for gross adjustment of the increments of powder for rifle cartridges and the second plunger is used for finer adjustment of the same increments. On the other hand, if smaller increments of powder for pistol cartridges are to be measured, the larger plunger is rendered inoperative by adjusting it to a position flush with the passage in which it is mounted and then the smaller plunger is retracted in the larger plunger to form a small pocket of the required size. Thus the change-over from measuring one size of increments to the other size of increments is accomplished merely by rotating the two plungers individually as required. The new arrangement provides more accurate control of the size of the increments for loading rifle cartridges because the measuring pocket comprises a portion of the larger passage together with an adjacent portion of the smaller passage and the smaller plunger may be rotated for fine adjustment of the combined volumes of the two pockets.

With reference to the need for an expeditious procedure for emptying the hopper, the invention provides for quick removal of the two measuring plungers from the rotatable measuring member to leave the diametrical passage through the measuring member clear from end to end. By virtue of this arrangement the hopper may be emptied by simply withdrawing the two plungers to clear the diametrical passage and then turning the rotatable measuring member to a position at which the cleared passage extends downward from the atmosphere to the exterior of the device.

The need for simple and expeditious dismantling of the device is met, in part, by the provision for withdrawing the two plungers from the diametrical passage of the rotatable measuring member. When the two plungers are withdrawn, the rotatable measuring member may be withdrawn axially from the fixed structure of the device. With the rotatable measuring member removed, all of the inner surfaces of the fixed structure are accessible and all of the surfaces of the rotatable measuring member are exposed as well as the surfaces of the two measuring plungers.

The features and advantages of the invention may be understood from the following detailed description in conjunction with the accompanying drawings.

In the drawings, which are to be regarded as merely illustrative:

FIG. 1 is a front elevation of a selected embodiment of the invention;

FIG. 2 is a greatly enlarged section taken along the line 2—2 of FIG. 1 showing the rotary measuring member in a position to receive an increment of powder from the hopper and further showing the plunger assembly adjusted for a size of increment suitable for a pistol cartridge;

FIG. 3 is an exploded view showing the parts of the dual plunger assembly;

FIG. 4 is a fragmentary sectional view showing how the two plungers may be adjusted for measuring increments of powder for rifle cartridges;

FIG. 5 is a fragmentary elevational view, with parts broken away, to show how an easily removable set screw may be employed to retain the dual plunger assembly in the rotatable measuring member; and FIG. 6 is a fragmentary sectional view showing how, with the dual plunger assembly removed, the diametrical passage of the rotatable measuring member may be employed to empty the hopper into a receptacle.

Referring to the selected embodiment of the invention illustrated by the drawings, the dispensing device has a housing with a cylindrical portion 10 open at both ends to journal a rotary body or measuring member 12, the rotary body having a diametrical passage 14 therethrough. What may be termed a plunger assembly, generally designated 15, is mounted in the diametrical passage 14 to form therewith a variable pocket for measuring predetermined increments of powder. The outer end of the plunger assembly 15 protrudes from the diametrical passage 14 and extends radially of the rotary body 12 through a wide slot 16 in the cylindrical portion of the housing.

The housing forms an intake passage 18 which leads to an intake port 20 in the cylindrical portion 10 of the housing and the outer end of the intake passage forms an annular seat 22 to receive and support an upright hopper 24. In the construction shown, the hopper 24 is in the form of a cylinder of transparent material such as glass or a suitable plastic.

The housing further forms a discharge port 25 in the cylindrical portion 10 which communicates with a downwardly extending discharge passage 26 formed by a discharge spout 28. The lower end of the discharge spout 28 is internally threaded to receive a discharge nozzle 20 in the form of a bushing. The discharge nozzle 30 is dimensioned to fit a particular relatively short pistol cartridge 32 and may be replaced by other discharge nozzles dimensioned to fit other cartridges of different calibers.

For the purpose of supporting the housing in the elevated position shown in FIGS. 1 and 2, the discharge spout 28 seats in a circular aperture 34 in an elevated portion 35 of a support bracket 36, the discharge spout being releasably anchored relative to the bracket by a suitable lock nut 38. The support bracket 36 is of angular construction and has a horizontal base portion 40 of which may be anchored by a pair of screws 42 to a support surface 44 such as a table top or counter top.

The rotary body or measuring member 12 is rotatable through an angle slightly larger than 90° for the purpose of receiving an increment of powder from the intake passage 18 and delivering the increment to the discharge passage 26. Any suitable means may be provided for manual oscillation of the rotary body 12 between these two positions. In this specific embodiment of the invention, an angular crank 45 having a handle 46 is mounted on one end of the rotary body 12 by a pair of screws 48.

The diametrical passage 14 through the rotary body 12 is enlarged at its outer end as indicated at 50 to receive an internally threaded sleeve or bushing 52 of the plunger assembly 15. The bushing 52 may be releasably secured by a set screw 54, shown in FIGS. 1 and 2, which is mounted in the end of the rotary body 12 that is opposite from the end on which the crank 45 is mounted.

What may be termed a first plunger 55 is formed with a head 56 for sliding fit in the diametrical passage 14 and is further formed with a shank 58 of slightly reduced diameter, the shank having an external screw thread 60 by means of which it is mounted in an axially adjustable manner in the bushing 52. Normally a lock nut 62 embracing the shank 58 is tightened against the outer end of the bushing 52 to hold the first plunger at whatever axial position to which it may be adjusted.

The first plunger 55 is formed with an axial bore 64 throughout its length, which bore may be conveniently termed a second passage. Mounted in the second passage 64 is a second plunger 65 that is formed with a head 66 dimensioned for sliding fit in the second passage. The second plunger 65 has a shank 68 of smaller diameter than the head 66. For axial adjustment of the second plunger 65 in the second passage 64, the shank 68 of the second plunger is formed with an external screw thread 70. The outer end of the second passage is reduced in diameter and is formed with an internal screw thread to engage the external screw thread 70 of the second plunger. Normally a suitable lock nut 72 embraces the shank of the second plunger 65 in tight abutment against the outer end of the first plunger 55 to retain the second plunger at whatever axial position it may be adjusted. For convenience, in manual adjustment of the two plungers, the outer end of the first plunger is knurled as indicated at 74 and the outer end of the second plunger is knurled as indicated at 75.

The previously mentioned slot 16 in the cylindrical portion 10 of the housing is of a circumferential length required for oscillation of the rotary body 12 and is dimensioned to confine the bushing 52. Thus the bushing 52 cooperates with the slot to hold the rotary body 12 against axial movement.

The first screw plunger 55 may be adjustable to measure up to 100 grains of powder, each revolution of the screw plunger making a difference of four grains. As shown in FIG. 3 the shank of the first plunger may be formed with a longitudinal flat which carries a series of numerals 76 denoting tens of grains. The second smaller screw plunger 55 may measure up to 50 grains and may also be formed with a longitudinal flat 78 bearing numerals 80 to indicate tens of grains.

The manner in which the selected embodiment of the invention functions for its purpose may be readily understood from the foregoing description. FIG. 4 shows the plunger assembly adjusted to measure out an increment of powder for a rifle cartridge. In FIG. 4, the head 56 of the first plunger 55 is retracted in the diametrical passage 14 to form a pocket 82 to receive powder and the head 66 of the second smaller plunger 65 is slightly retracted in the second passage 64 to form a small auxiliary pocket 84. Since the smaller pocket 84 opens into the larger pocket 82, the two pockets 82 and 84 may be regarded as a single variable pocket, course adjustment of the variable pocket being accomplished by rotation of the first plunger 55 and fine adjustment being accomplished by rotation of the smaller plunger 75. Thus the provision of the second passage 84 and the second plunger 64 makes possible highly accurate measurement of an increment of powder for loading a rifle cartridge.

FIG. 2 shows how the plunger assembly may be adjusted to measure an increment of powder for the pistol cartridge 32. In FIG. 2 the head 56 of the first plunger 55 is adjusted at a position substantially flush with the end of the diametrical passage 14 so that the first plunger 55 does not enter into the measurement of powder. The second plunger 65 is retracted relative to the first plunger 55 to form an auxiliary pocket 85 of the precise dimensions required for loading a pistol cartridge.

An important feature of the invention is that the plunger assembly 15 may be withdrawn from the diametrical passage 15 to leave the diametrical passage clear for the purpose of emptying the hopper 24 and the intake passage 18. To withdraw the plunger assembly 15 merely requires retracting the set screw 54 sufficiently to release the bushing 52. With the rotary body or measuring member 12 in the position shown in FIG. 2, the plunger assembly 15 may be removed to clear the diametrical passage 14 and thus permit the powder in the hopper 24 to gravitate through the intake passage 18 and the diametrical pasage 14 to fall into a suitable receptacle 86 as indicated in FIG. 6.

It is a simple matter to completely dismantle the device for the purpose of cleaning the various parts. When the set screw 54 is loosened and the plunger assembly 15 is withdrawn from the rotary body 12, the angular crank 45 may be used as a handle to withdraw the rotary body 12 from the cylindrical portion 10 of the housing. When the rotary body 12 is withdrawn from the housing all of the inner surfaces of the housing are readily accessible for cleaning. The parts of the withdrawn plunger assembly 15 may be separated as shown in FIG. 3 to make all of the surfaces of the parts freely accessible for cleaning.

My description in specific detail of the selected embodiment of the invention will suggest various changes, substitutions and other departures from my disclosure within the spirit and scope of the appended claims.

I claim:

1. Apparatus for loading cartridges with powder from a hopper, including,
   a first housing having an inlet port to receive the powder from the hopper and having a discharge port to dispense the powder,
   a member journalled in the housing for oscillation between a receiving position in communication with the inlet port and a dispensing position in communication with the discharge port, the member having a first axial passage to form a first pocket for receiving the powder from the hopper at the receiving position and to release the powder to the discharge port at the discharge position,
   a first plunger axially adjustable in the first passage to vary the volume of the first passage in accordance with such adjustment and provide for gross increments of powder for cartridges, the first plunger having a second axial passage to define a second pocket,
   first means mounted on the member for axial adjustment on the member to control the axial adjustment of the first plunger and to lock the first plunger in the controlled position,
   a second plunger axially adjustable in the second passage to vary the volume of the second pocket in accordance with such adjustments and provide for fine increments of powder for cartridges, and
   second means mounted on the second plunger for axial adjustment on the member to control the axial adjustment of the second plunger and to lock the second plunger in the controlled positions,
   the first and second plungers being externally threaded and the first and second means respectively constituting lock nuts.

2. Apparatus for loading cartridges with powder from a hopper, including,
   a first housing having an inlet port to receive the powder from the hopper and having a discharge port to dispense the powder,
   a member journalled in the housing for oscillation between a receiving position in communication with the inlet port and a dispensing position in communication with the discharge port, the member having a first axial passage to form a first pocket for receiving the powder from the hopper at the receiving position and to release the powder to the discharge port at the discharge position,
   a first plunger axially adjustable in the first passage to vary the volume of the first passage in accordance with such adjustment and provide for gross increments of powder for cartridges, the first plunger having a second axial passage to define a second pocket,
   first means mounted on the member for axial adjustment on the member to control the axial adjustment of the first plunger and to lock the first plunger in the controlled position,
   a second plunger axialy adjustable in the second passage to vary the volume of the second pocket in accordance with such adjustments and provide for fine increments of powder for cartridges, and
   second means mounted on the second plunger for axial adjustment on the member to control the axial adjustment of the second plunger and to lock the second plunger in the controlled position,
   the first axial passage in the member being enlarged at one end and bushing means being disposed on the first plunger in the enlargements in the axial passage and being releasably secured to the member to provide for a dismantling of the first and second plungers and the first and second means from the member, upon the release of the bushing means, for the purpose of cleaning the member and the first and second plungers and first and second means.

3. Apparatus as set forth in claim 2 wherein the first and second plungers are externally threaded and wherein the first and second means respectively constitute lock nuts.

4. Apparatus for loading cartridges with powder from a hopper, including,
   a first housing having an inlet port to receive the powder from the hopper and having a discharge port to dispense the powder,
   a member journalled in the housing for oscillation between a receiving position in communication with the inlet port and a dispensing position in communication with the discharge port, the member having an axial passage communicating with the inlet port in the receiving position and with the discharge port in the dispensing position, the axial passage having an enlarged portion at one end,
   bushing means disposed in the enlarged portion of the axial passage and having an internally threaded bore,
   means releasably securing the bushing means to the member,
   a first plunger disposed in the axial passage and externally threaded to cooperate with the internaly threaded bore in the bushing means,
   first means disposed on the first plunger for locking the first plunger in any axially adjustable position to provide a gross adjustment in the amount of powder to be dispensed to the cartridges,
   the first plunger having an internally threaded bore,
   a second plunger disposed in the internally threaded bore of the first plunger and externally threaded to cooperate with the internally threaded bore in the first plunger, and
   second means disposed on the second plunger for locking the second plunger in an axially adjustable position to provide a fine adjustment in the amount of powder to be dispensed in the cartridges,
   the first and second means constituting lockwashers having internally threaded bores to respectively cooperate with the external threads on the first and second plungers.

References Cited

UNITED STATES PATENTS

| 629,120 | 7/1899 | Barlow | 86—33 |
| 566,217 | 8/1896 | Ohman | 86—31 |
| 1,181,206 | 5/1916 | Basehore et al. | 73—429 |

FOREIGN PATENTS 424,972  9/1947  Italy.

BENJAMIN A. BORCHELT, Primary Examiner.

P. A. SHANLEY, G. H. GLANZMAN,
Assistant Examiners.